(12) United States Patent
Terrell

(10) Patent No.: US 6,990,770 B2
(45) Date of Patent: Jan. 31, 2006

(54) APPARATUS FOR TRIMMING AND CHEMICALLY TREATING TREES

(75) Inventor: Steven J. Terrell, Sugar Land, TX (US)

(73) Assignee: Steven J. Terrell & Associates, Inc., Sugar Land, TX (US)

(*) Notice: Subject to any disclaimer, the term of this patent is extended or adjusted under 35 U.S.C. 154(b) by 0 days.

(21) Appl. No.: 10/679,920

(22) Filed: Oct. 6, 2003

(65) Prior Publication Data

US 2005/0072042 A1    Apr. 7, 2005

(51) Int. Cl.
A01D 19/00 (2006.01)
B25F 3/00 (2006.01)
B23D 11/12 (2006.01)
A01G 23/08 (2006.01)

(52) U.S. Cl. .................. 47/1.5; 47/57.5; 56/16.8; 144/4.1; 144/34.1; 144/24.12; 30/123.3; 30/123.4

(58) Field of Classification Search ............... 47/1.5, 47/57.5, 1.7, DIG. 11; 56/16.8; 144/4.1, 144/34.1, 24.12; 30/123.3, 123.4
See application file for complete search history.

(56) References Cited

U.S. PATENT DOCUMENTS

| | | |
|---|---|---|
| 776,743 A | 12/1904 | Von Holdt |
| 1,364,432 A | 1/1921 | Georgelis |
| 2,538,371 A | 1/1951 | Le Tourneau |
| 2,663,952 A | 12/1953 | Winget |
| 2,878,633 A * | 3/1959 | Mullin ..................... 56/16.8 |
| 3,017,121 A * | 1/1962 | Carlson ..................... 239/129 |
| 3,183,949 A | 5/1965 | Larson |
| 3,234,976 A | 2/1966 | Grant |
| 3,252,487 A | 5/1966 | Larson |
| 3,343,575 A | 9/1967 | Trout |
| 3,389,728 A | 6/1968 | Galis |
| 3,443,611 A | 5/1969 | Jorgensen |
| 3,461,928 A | 8/1969 | Siiro |
| 3,468,352 A | 9/1969 | Larson |
| 3,529,642 A | 9/1970 | Kamner |
| 3,565,372 A | 2/1971 | Jones et al. |
| 3,664,391 A | 5/1972 | Coffey |
| 3,675,691 A | 7/1972 | Denovan |
| 3,688,816 A | 9/1972 | Runeson |
| 3,720,246 A | 3/1973 | David |
| 3,763,905 A | 10/1973 | Hamilton et al. |
| 3,974,866 A | 8/1976 | Saarenketo |
| 3,991,799 A | 11/1976 | Albright |
| 4,050,488 A | 9/1977 | Albright |
| 4,063,359 A | 12/1977 | Luscombe |
| 4,269,241 A | 5/1981 | Hickman |
| 4,291,492 A * | 9/1981 | Reynolds et al. ............ 47/12 |
| 4,522,239 A | 6/1985 | Gaitten |

(Continued)

FOREIGN PATENT DOCUMENTS

WO    WO 9304574 A1 *   3/1993

Primary Examiner—Peter M. Poon
Assistant Examiner—Andrea M. Valenti
(74) Attorney, Agent, or Firm—Wong, Cabello, Lutsch, Rutherford & Brucculeri, LLP

(57) ABSTRACT

Disclosed herein is an apparatus preferably coupled to a boom on a truck which can simultaneously trim and chemically treat trees or other vegetation with a herbicide. The apparatus, in addition to have a standard saw blade assembly with limb clamping jaws, includes a sprayer assembly. The sprayer assembly includes nozzles which administer herbicides or other chemical treatments adjacent to the saw blades, allowing herbicide to be precisely administered to the tree limbs as they are cut.

44 Claims, 4 Drawing Sheets

U.S. PATENT DOCUMENTS

| | | | |
|---|---|---|---|
| 4,569,379 A | | 2/1986 | Gemmell-Murdoch |
| 4,926,622 A | * | 5/1990 | McKee ........................ 56/16.8 |
| 5,050,303 A | * | 9/1991 | Sinclair et al. ............ 30/123.4 |
| 5,143,131 A | * | 9/1992 | Seigneur et al. ............ 144/364 |
| 5,220,773 A | * | 6/1993 | Klaeger ....................... 56/10.4 |
| 5,329,752 A | * | 7/1994 | Milbourn ................. 56/16.4 R |
| 5,378,852 A | | 1/1995 | Manor |
| 5,390,715 A | | 2/1995 | Luscombe |
| 5,426,854 A | * | 6/1995 | Leini et al. ................. 30/123.4 |
| 5,441,090 A | | 8/1995 | Hill et al. |
| 5,501,257 A | * | 3/1996 | Hickman .................... 144/34.1 |
| 5,503,201 A | * | 4/1996 | Strickland et al. ......... 144/34.5 |
| 5,987,862 A | * | 11/1999 | Long et al. ................... 56/27.5 |
| 6,125,621 A | * | 10/2000 | Burch ........................ 56/16.8 |
| 6,439,279 B1 | * | 8/2002 | Underwood ............... 144/34.6 |
| 6,497,088 B1 | * | 12/2002 | Holley ....................... 56/16.8 |
| 6,643,933 B2 | * | 11/2003 | Seigneur .................... 30/123.4 |
| 2004/0045166 A1 | * | 3/2004 | Hobday et al. ............. 30/123.3 |

\* cited by examiner

APPARATUS FOR TRIMMING AND CHEMICALLY TREATING TREES

FIELD OF THE INVENTION

The present invention relates generally to a tool for trimming trees, and more particularly to a tool for trimming and chemically treating trees near power lines.

BACKGROUND

Electrical power lines often run through heavily wooded areas, either in neighborhoods or in rural areas. Normally a path, or right of way, is cut through such wooded areas to make way for the power lines, but eventually the trees or other vegetation will encroach upon this path and it will need to be trimmed back. For example, tree limbs over time may grow over the power lines, presenting the risk of damaging the lines should the limbs fall. Typically, such trimming is required every five years or so, although this time period can be shorter or longer in a given area. Because power lines often span long distances, such as hundreds of miles, a trimming operation can be quite a complex and time intensive endeavor for which efficiency is a priority.

Many different ways of trimming such trees in such an application have been proposed in the prior art. In one approach, a mobile unit such as a "bucket truck" is deployed. The bucket truck is so called because it has a bucket connected to a boom (a crane-like structure), which is in turn connected to the chassis of the truck. The bucket (or "gondola" as it is sometimes known) contains room for a worker and associated tree trimming equipment, such as a hand operated chain saw. Once in the bucket, the worker is hoisted up to an appropriate height to trim the trees. Thus, the worker can manually cut the tree limbs to combat encroachment of the trees toward the power lines. This approach, however, is not optimal because it is slow, and involves potential liability costs associated with hoisting a person to potentially dangerous heights while simultaneously operating dangerous equipment.

In another approach disclosed in U.S. Pat. No. 4,269,241 (the '241 patent), which is incorporated herein by reference in its entirety, the bucket on the end of the boom is replaced with a limb grasping and cutting assembly. The assembly contains jaws for clamping a tree limb to be cut, and a circular saw blade for cutting the grasped limb. The assembly can spin around the axis formed by the boom to allow the jaws to be brought into alignment with a particular tree branch. Once the tree limb is grasped, the circular saw blade is advanced away from the assembly and from the boom toward the intersection of the jaws, thereby cutting the limb. After cutting, the saw blade is retracted back inside its housing, and, in theory, the cut tree limb will be held by the jaws, which will allow the boom operator to place it appropriately on the ground for disposal. This automated process is an improvement over more manual techniques.

In another approach, disclosed in U.S. Pat. No. 5,501,257 (the '257 patent), which is incorporated herein by reference in its entirety, a similarly functioning boom-mountable assembly is disclosed for grasping and cutting tree limbs. The assembly of the '257 patent differs from that of the '241 patent in that it offers more degrees of freedom in the movement of the assembly. For example, the assembly can be pivoted away from the long axis of the boom, allowing the assembly to be bent upwards or downwards relative to the long axis, or from left to right, depending on the angle that the assembly has been rotated around the long axis. Moreover, the cutting assembly has a linear array of saws that can be swiveled through 360 degrees to provide for more flexible cutting. This automated process is also an improvement over more manual techniques.

Other prior art tree trimming apparatuses are manufactured by Jarraff Industries, Inc., Timberland Equipment Ltd., TSE International, Inc., and Kershaw, which are known to disclose similar single or multiple saw blade assemblies mounted on booms.

Still other techniques, or related techniques, are disclosed in the following U.S. patents, which are all incorporated herein by reference: U.S. Pat. Nos. 4,522,239; 4,569,379; 5,378,852; 5,390,715; 5,441,090; 776,743; 1,364,432; 2,538,371; 3,234,976; 3,343,575; 3,565,372; 3,664,391; 3,688,816; 3,720,246; 4,063,359; 3,183,949; 3,389,728; 3,529,642; 3,675,691; 3,720,246; 3,763,905; 3,974,866; 3,991,799; 4,050,488; 3,252,487; 3,443,611; 3,461,928; 3,468,352; and 2,663,952.

Another prior art practice relating to tree clearance at electrical power line right of ways deals with the administration of herbicides or wound dressing to impede tree growth. Herbicides can be liberally sprayed usually manually in the location of unwanted tree limbs or vegetation, but this approach can be undesirable and inadvertently might kill trees or vegetation that do not presently pose a problem. Additionally, providing even and controlled coverage is a problem, because the operator usually sprays the herbicide from the ground using an attachment which may need to reach heights of tens of feet and which may be difficult to manually control. Accordingly, instead of broadly spraying herbicides in the general location of trees or other vegetation encroaching on the right of way, it is preferable to administer herbicides more precisely near the edges where tree limbs have been cut. By spraying only the exposed cut portions of the trees, the herbicide or wound dressing is made more effective as it can directly enter the tree at the cut site, perhaps impeding the growth of limbs without killing the trees outright.

Accordingly, it has been known to place a worker in a bucket in a bucket truck to cut limbs and/or to hand spray herbicides on the cut portions or other limbs of the trees. This normally requires the worker to have a reservoir of herbicide in the bucket, or for the herbicide to be pumped from a reservoir on the truck itself. The worker must also usually have a manually operated saw in the bucket, as there may be locations along the right of way for which it would be undesirable or improper to spray herbicide (e.g., near a private residence having sensitive vegetation). This approach is thus inefficient. It requires first that the tree limbs be cut manually and/or sprayed manually. Furthermore, this approach again presents the problem of having a worker in the air, with its associated costs as discussed above. The worker is also subject to additional health risks, as he might become covered by the herbicide, or may be electrically shocked when spraying wet chemicals near to the power lines. Moreover, herbicide administration is potentially unfocused in its administration. Additionally, if a tree trimming vehicle such as those discussed earlier are used to cut certain tree limbs, two pieces of equipment will be needed (the tree trimming vehicle and the spray truck), which increases the costs of operation.

The art would therefore benefit from an improved, more automated way for trimming trees near power lines and for chemically treating them if necessary. This disclosure presents such a solution.

SUMMARY OF THE DISCLOSURE

Disclosed herein is an apparatus preferably coupled to a boom on a truck which can simultaneously trim and chemically treat trees or other vegetation with a herbicide. The apparatus, in addition to have a standard saw blade assembly with limb clamping jaws, includes a sprayer assembly. The sprayer assembly includes nozzles which administer herbicides or other chemical treatments adjacent to the saw blades, allowing herbicide to be precisely administered to the tree limbs as they are cut.

BRIEF DESCRIPTION OF THE DRAWINGS

The foregoing summary, preferred embodiments, and other aspects of the inventive concepts will be best understood with reference to a detailed description of specific embodiments, which follows, when read in conjunction with the accompanying drawings, in which.

DETAILED DESCRIPTION

In the interest of clarity, not all features of actual implementations of an apparatus for trimming and chemically treating trees are described in the disclosure that follows. It should be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that the development of an apparatus for trimming and chemically treating trees would nevertheless be a routine undertaking for those of skill in the art given the details provided by this disclosure.

Disclosed herein is an improved tree trimming and chemical treatment apparatus 22 which is also capable of providing a chemical treatment to the tree limbs that are being cut, and which is particularly useful in trimming tree lines present at electrical power line right of ways. In a preferred embodiment, the chemical treatment comprises a herbicide, which helps to even further wither back the cut limbs and to impede their future encroachment onto the right of way. Accordingly, with the combination of trimming and chemical treatment, trimming need occur less frequently.

Figure 1:
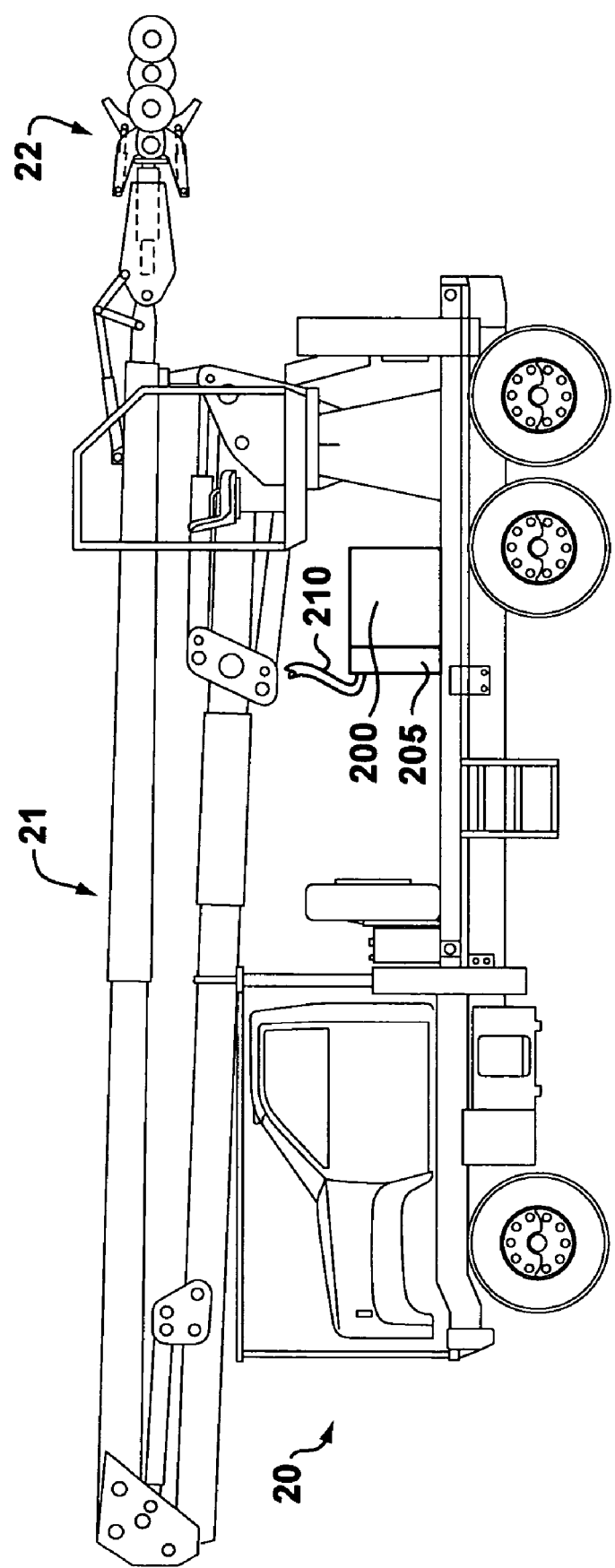
FIG. 1 shows a truck with a boom, to which is connected the disclosed apparatus for trimming and chemically treating trees.

As with some of the prior approaches discussed in the background section of this disclosure, the disclosed tree trimming and chemical treatment apparatus 22 is preferably mounted to a boom 21 on a truck 20, as shown in FIG. 1. As the various features of the truck, the apparatus, and the boom are discussed in above-incorporated '257 patent, they are not further discussed here, and familiarity with these components are presumed. (Similar element numerals, where appropriate, are used herein as are used in '257 patent). As the apparatus is capable of administering a chemical such as a herbicide, as will be discussed in more detail later, the truck is also fitted with a chemical tank 200. The tank 200 communicates a liquid such as a herbicide via a pump 205 to the apparatus 22 via a hose 210, which is only partially shown in FIG. 1.

To keep it from tangling, the hose 210 is preferably plumbed with the other hydraulic lines through the boom 21 to the assembly 22. However, the hose 210 could also more simply be clamped to the boom 21 at various locations along its length, or directly attached to the assembly 22 free from the boom 21, although this is not preferred as tree limbs or other hazards might damage the hose. In any event, one skilled in the art will recognize that the tank 200, pump 205, and hose 210 could be arranged in any number of ways on the truck, and therefore are only shown diagrammatically for simplicity. The hose 210 at the location where it couples to the apparatus 22 should have a suitable swivel connection so that the apparatus can be manipulated through its many degrees of freedom, as explained below.

Figure 2:
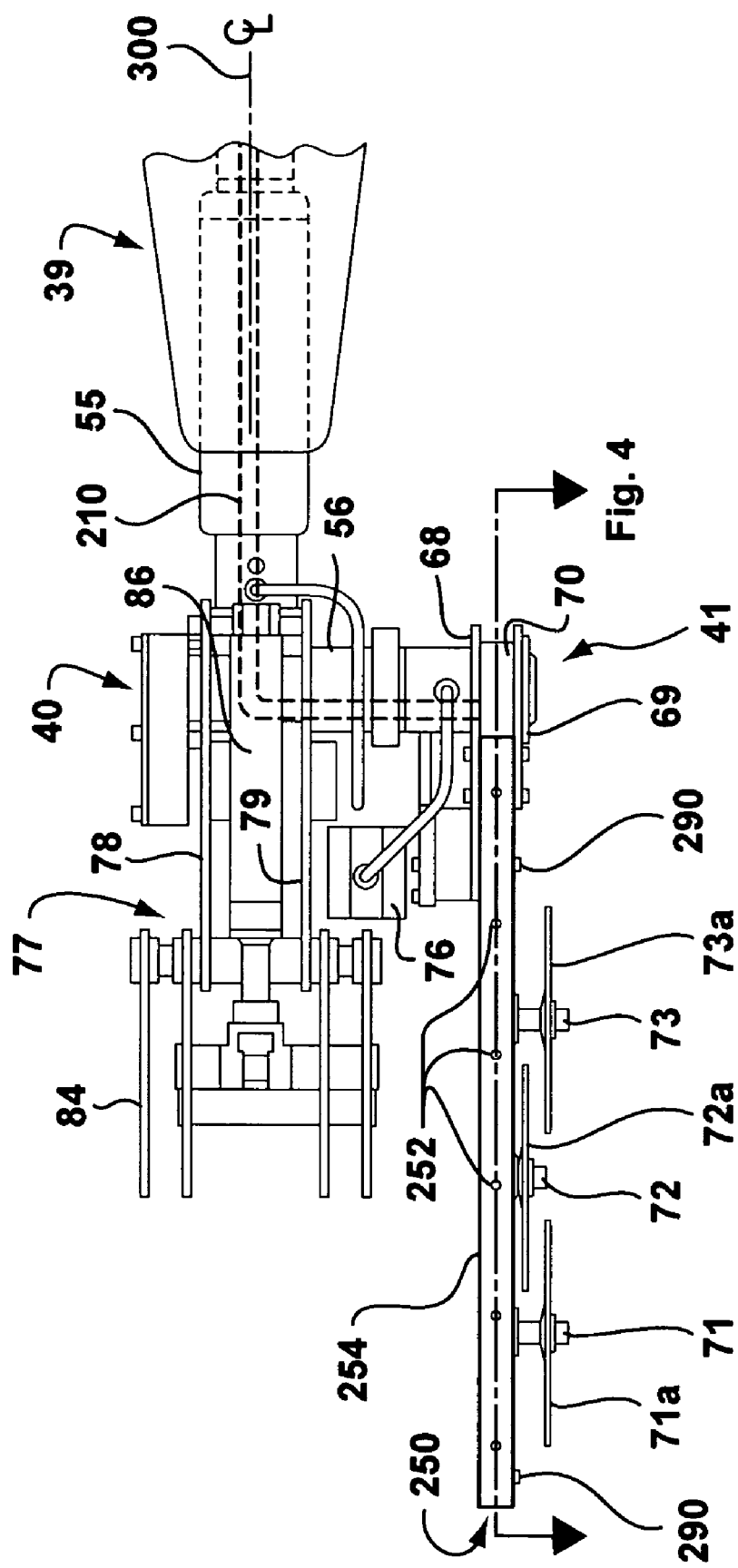
FIG. 2 shows a perspective view of the apparatus shown in FIG. 1.
Figure 3C:
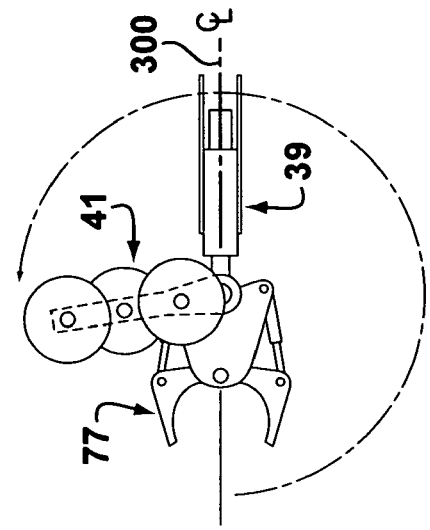
FIGS. 3A–3C illustrates the degrees of movement of the disclosed apparatus.
Figure 3B:
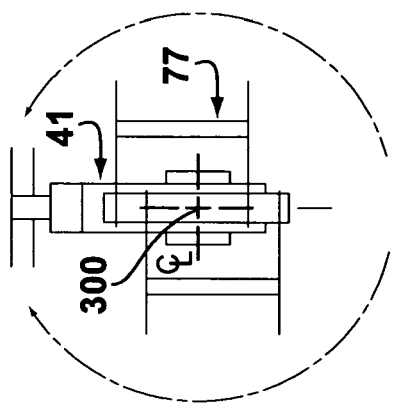
Figure 3A:
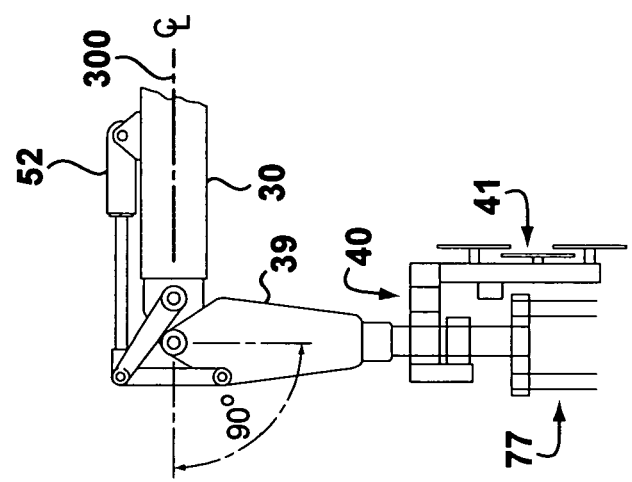

The apparatus 22 is shown in further detail in FIG. 2 and generally resembles the tree trimming apparatus disclosed in the above-incorporated '257 patent. The apparatus 22 includes, amongst other details, a tree limb clamping assembly 77 having jaws for grabbing tree limbs as discussed earlier, and a saw arm section 41 comprising a number of saw blades 71a, 72a, and 73a, which normally measure from 16 to 21 inches in diameter. The apparatus 22 is moveable or manipulatable through many degrees of freedom to facilitate the trimming and grasping of tree limbs regardless of their orientation. For example, the assembly 22 is bendable with respect to the long axis 300 of the boom (FIG. 3a), is rotatable around the long axis of the boom (FIG. 3b), and the saw arm section 41 is pivotable around the assembly (FIG. 3c). Again, further details concerning the manners in which the apparatus 22 can be manipulated can be found in the '257 patent. Although not shown, the jaws of the tree limb clamping assembly 77 can be serrated to assist in holding multiple tree limbs in place. Moreover, if the hydraulics for the jaws are strong enough, they can be made to snap the clamped limbs without sawing. Although two moving jaws are shown, the apparatus 22 need contain only a single moveable jaw which is capable of clamping the tree limbs against an otherwise stationary jaw-like portion of the apparatus.

What is most different about the disclosed apparatus 22 from the assembly disclosed in the '257 patent is the addition of a sprayer assembly 250. The sprayer assembly 250 is preferably formed as a portion of the saw arm section 41, although this is not strictly necessary. In a preferred embodiment, the sprayer assembly 250 is formed in the saw arm 254 which houses the bearings and belts for the saw blades 71a, 72a, 73a, and which is approximately four feet long. Further details of the sprayer assembly 250 can be seen in FIG. 4, which shows a cross section through the center of the saw arm 254 parallel to the saw blades 71a, 72a, and 73a. As shown, the saw arm 254 is formed with channels 256 on the top and bottom of the arm. These channels 256 communicate with nozzles 252 on the outside surface of the saw arm 254, and with the hose 210 coupled to the tank 200 on the truck. The hose is preferably clamped to a lip on the edge of the saw arm 254 (clamp not shown) to create a high pressure seal, which allows fluid to flow from the tank through the hose 210, into the channels 256, and ultimately out the nozzles 252.

There are approximately preferably six nozzles 252 spanning across the top and bottom of the saw arm 254, although more or fewer could be used. Threaded orifices are formed in the saw arm 254 at the nozzle locations, allowing the nozzles 252 to be threaded thereto. As shown, it is preferable for the nozzles 252 to be flush mounted in the saw arm 254 to reduce the possibility that the nozzles 252 will be damaged by the vegetation that is being cut.

The saw arm 254 further defines a space 260 which allows the shafts 71, 72, and 73 of the saw blades 71a, 72a, 73a to pass through. (The bearings for these shafts 71, 72, and 73 are not shown for clarity). The space 260 also allows for belts 262a, 262b, and 262c for communicating rotational movement from a drive shaft 99 to the saw blade shafts 72, 73 during a trimming operation. As means for driving a drive shaft are disclosed in the '257 patent, such details are not repeated here.

So configured, the sprayer assembly 250 allows herbicide to be administered to tree limbs simultaneously as they are cut. While the nozzles 252 will generally spray the herbicide about an arc, the spray pattern is largely parallel with the saw blades 71a, 72a, and 73a. However, some amount of herbicide is preferably directly sprayed directly onto the saw blades, such that simultaneous spraying and trimming allows herbicide to be administered directly at the location of the trimmed limbs, which improves the effectiveness of herbicidal uptake into the trimmed vegetation. In addition, because of the nozzles' directionality, and because their spray is blocked in part by the saw blades 71a, 72a, and 73a, herbicide administration is made more precise with less waste. However, one skilled in the art will recognize that the nozzles 252 can be modified both in their directionality and the broadness of the sprayed arc they produce.

Trimming and/or herbicide administration is controlled by an operator in the cab of the truck, which has independent controls for each of these operations. Accordingly, the operator (as well as driving the truck, operating the boom, and moving the apparatus 22 to a proper orientation) can independently control the sprayer assembly 250 and the saw blades 71a, 72a, 73a, thus allowing trimming and spraying to be performed individually or to be performed at the same time.

The sprayer assembly 250 can be modified to further include spray nozzles 290 (FIG. 2; shown in phantom in FIG. 4) positioned on the saw arm 254 and perpendicular to the nozzles 252 and the saw blades 71a, 72, and 73a. Such a modification is particularly useful in applications were herbicide needs to be liberally broadcast over broader area. Such nozzles 290 can communicate with the same channels 256 used to feed nozzles 252, or can be independently controlled so that nozzles 290 can be activated independently of nozzles 252. Such flexibility is beneficial depending on the type of spraying operation to be performed. For example, if desired to merely broadcast herbicide generally over a wide area without trimming (for example, to kill lower lying brush that need not be trimmed, or to penetrate a tree canopy), activation of nozzles 290 is preferable, in which case the apparatus 22 can be oriented to point the nozzles 290 in the general direction of the vegetation to be killed. By contrast, activation of nozzles 252 is preferred during a trimming operation for the reasons stated earlier.

To achieve a wider broadcast of herbicide, nozzles 292 are preferably "pop up" nozzles which emerge from the saw arm 254 upon the application of fluid pressure. The use of two such nozzles 290 on far ends of the saw arm 254, and clear of the saw blades 71a, 72a, and 73a, is preferred, but other orientations are possible through modification to the saw arm 254. Because nozzles 290 are pop up nozzles, it is believed preferable not to activate them during a trimming operation, as the nozzles might become damaged by the vegetation being trimmed. If use of nozzles 290 is required during a given application, it is preferable to unscrew and replace them with flush mounted nozzles similar to nozzles 252. Due to the arc of herbicide sprayed from both nozzles 252 and 290, the spray patterns for each will normally overlap when activated at the same time.

Separate normally-closed solenoid valves can be used to independently activate nozzles 252 or 290. Although only one hose 210/channel 256 is shown for feeding the nozzles 252, one skilled in the art will recognize that a similar hose/channel system would be necessary to feed nozzles 290; such additional hardware is not shown for clarity.

Figure 4:
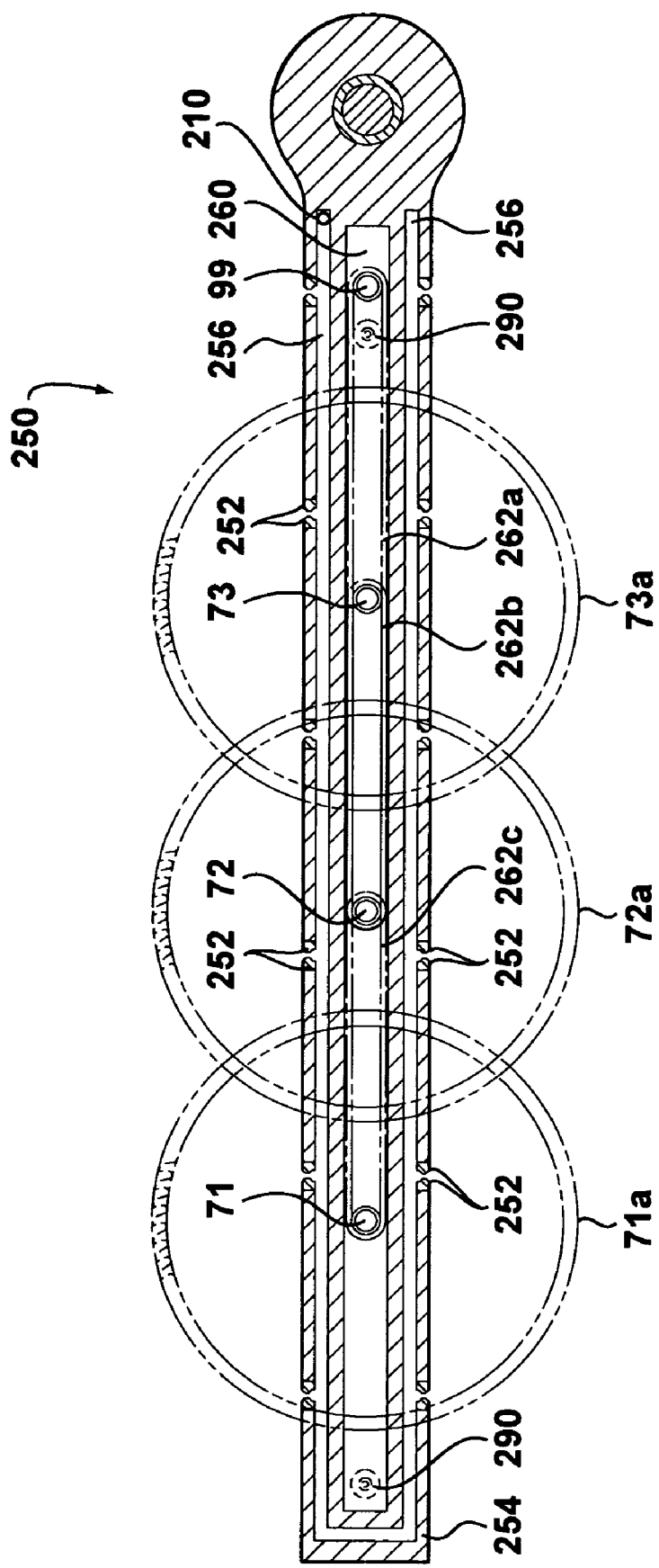
FIG. 4 shows a cross sectional view through the saw arm of the disclosed apparatus, and including channels for distributing a herbicide through nozzles while cutting.

The illustrated construction of the saw arm 254 to incorporate means for administering the herbicide or other chemical treatment is merely illustrative, and could be built in several different ways to achieve the benefits disclosed herein. For example, the saw arm could be formed in two halves with channels 256 forged or milled therein, with the two halves later bolted together with rubber gaskets (not shown) to ensure that the channels will not leak. Or, the channels could be milled into a single piece of bar stock, with the milling holes later plugged or covered to achieve the same basic design and functionality as shown in FIG. 4. Later, the nozzles 252 can be screwed into place. Alternatively, the nozzles 252 may merely comprise holes in the side of the saw arm, although a nozzle mechanism is preferred for those applications requiring a spray of herbicide instead of a mere "stream" of herbicide. Optionally, the saw arm 254 may be made essentially hollow, with the channels 256 instead being replaced by internal holes coupled to the nozzles 252. Or in another modification, the channels 256 can constitute hoses external to the saw arm and spanning along the saw arm's length. It should be noted that, while preferred, the sprayer assembly 250 need not be incorporated with the saw arm 254. The sprayer assembly 250 can exist elsewhere on the apparatus 22, and could be configured in any number of ways to achieve the benefits disclosed herein.

The preferred herbicide for use with the disclosed assembly comprises Krenite™ S Brush Control Agent (hereinafter "Krenite"), which is manufactured by DuPont. At a preferred solution strength of 1.5 to 2.0% Krenite, approximately 154 gallons of solution will treat one linear mile of tree line, assuming a moderate brush density. For high brush densities, approximately twice as much solution might be necessary. The preferred size of the chemical tank 200 is approximately 300 or more gallons, which allows for approximately two miles of tree line to be cut and treated. As this is approximately the distance of tree line that can be trimmed in one day, the tank 200 should hold enough herbicide for a day's work. Of course, if necessary, the size of the tank 200 can be adjusted.

Although the Krenite can work suitably by itself, additional chemicals can be added to the Krenite to improve its effectiveness. For example, in a 1.5–2.0% Krenite solution, 0.25 to 0.5% of a suitable non-ionic surfactant can be added to the solution to promote the flow of Krenite into the tree. Moreover, one ounce of Escort™ herbicide, also manufactured by DuPont, can be added to 100 gallons of solution.

Additionally, the Krenite can be combined with Thinvert™, manufactured by Waldrum Specialties, Inc. Thinvert comprises an oil-based carrier which minimizes the propensity for the applied solution to drift. In a preferred solution, one part Krenite is mixed with 9 parts Thinvert.

Krenite turns out to be a particularly effective herbicide for the disclosed tree trimming procedure for another reason. Some results may indicate that when a cut in a tree limb is treated with Krenite, the limb will be stunted in its future growth. Any such future growth can be eradicated by another application of Krenite, as the previous application of Krenite has rendered such growth uniquely susceptible to future applications of Krenite. In other words, when a previously treated limb needs to be trimmed back again, Krenite merely needs to be administered, and the limbs may wilt away back to their original cut location without the need for further cutting. Thus, cutting need not always be accomplished when the limbs need to be trimmed back in the future, saving operational costs. For example, if an area needs trimming every five years, it initially could be cut and treated, and then at five years merely treated with Krenite, and then cut and treated at ten years, and so on.

When this is understood, it is seen that the disclosed apparatus 22 provides benefits even if trimming operations are not required; instead, the same vehicle and apparatus 22 can be used only in its spraying capacity if desired for a particular application. For example, lower lying brush may not need to be trimmed, but could still be chemically treated with the disclosed apparatus with good efficiency. Moreover, the disclosed apparatus 22 need not be built with saw blades at all, and instead can be built only with the sprayer assembly 250. So built, the apparatus 22 still has significant utility as its many degrees of freedom of movement of the apparatus 22 on the boom allows the chemical treatment at hand to be administered with particularity, as the apparatus can be manipulated into the proper position for spraying.

Although the assembly can be used to fully spray encroaching trees, it is preferred that spray only be admitted to the cut portions of the limbs, as excessive spaying of herbicides to the top or roots of the trees can kill them outright. This is not desirable in some application, where it is preferred that future limb growth merely be stunted. However, should wider area spraying be necessary, the flexibility in moving and positioning the apparatus 22, and hence the sprayer assembly 250, allows the spray to be broadcast wherever it is needed with precision.

The hose 210 coupled to the chemical tank 200 is preferably a ¾ inch diameter non conductive hose. The intervening pump 205 is preferably capable of supplying between 15–20 gallons/minute at pressure of approximately 300–400 psi. With these parameters in mind, the nozzles 252 are suitably chosen to spray the chemical treatment at least a few feet. One skilled in the art will recognize that many suitable nozzles can be used in conjunction with the disclosed apparatus 22.

Useful modifications can be made to the truck to improve the effectiveness of the trimming or chemical treatment operation. For example, the truck can be fitted with a Global Positioning System (GPS) device which can allow the position of the truck to be remotely determined along with pertinent data at the truck's location. Although not shown, the GPS device can be combined with a computer fitted inside of the cab of the truck, through which the various controls (such as saw activation, jaw activation, and spray activation) can be routed. In this way, the computer can capture truck location, and these and other operational parameters as a function of time. Moreover, other conditions not automatically detectable by the computer can be manually entered by the truck operator, such as hazards or useful pieces of information (creek, right of way obstructions, downed power lines, diseased, hazardous, or downed trees, climate conditions, etc.) that might need special attention or the use of special equipment or services. Such information can be useful for billing, and can also be useful to prove or disprove the work accomplished along the power line. For example, if spraying did not occur within a mile up or down of certain property along the right of way, the property owner could perhaps be placated that vegetation dying along the property was not caused by the spraying operation. If the computer is coupled to an antenna to broadcast the operational data back in real time to a central service center, the progress of various crews can also be monitored with ease.

Additionally, the controls in the truck can be operated by remote control, which is particularly useful if the operator cannot adequately see the apparatus 22 during a given operation. Thus, the controls (such as boom activation and manipulation, saw activation, jaw activation, and spray activation) normally within the cab of the truck can be mimicked and placed on a remote controller. With a computer associated with the controls in the cab having a suitable antenna or pick up, the operator can then take the remote controller outside of the cab to guide the apparatus 22 into a position where cutting, spraying, or apparatus manipulation etc. would be most useful.

The disclosed apparatus can be used to administer chemical treatments other than herbicides. For example, if desired, the tank can be filled with a fertilizer or with water to nourish the plants that are being trimmed, although obviously such a modification would not be beneficial to the right of way clearance application for which the apparatus was primarily designed. Additionally, tree wound dressing can be sprayed as well, which serves to protect the trees from disease while, like Krenite, retarding future growth at the cut site. Wound dressing (or some other form of growth retardant) might be especially advantageous in certain operations as some forms of herbicides cannot or should not be applied to freshly cut tree limbs. Moreover, insecticide can also be sprayed. "Chemical treatment" as used herein should be understood as indicative of all of these types of treatments, and other liquid or gaseous treatments.

As disclosed herein, it is preferred to use the disclosed apparatus 22 in conjunction with a boom on a vehicle, such as a truck. However, "vehicle" as used herein should be understood to include any mobile device on which the apparatus 22 can be mounted, such as trucks, rail road cars, mobile beds, tractors, trailers, boats, or pontoons.

It should be understood that the inventive concepts disclosed herein are capable of many modifications. To the extent such modifications fall within the scope of the appended claims and their equivalents, they are intended to be covered by this patent.

What is claimed is:

1. An apparatus for trimming and chemically treating vegetation, comprising:

a saw arm having a top, a bottom, sides and ends; a plurality of parallel saw blades affixed along a side of the saw arm for trimming the vegetation, wherein the saw blades each have an axis of rotation perpendicular to the side of the saw arm; and a plurality of nozzles affixed in or to the saw arm for spraying a chemical treatment on the vegetation in the proximity of the saw blades, wherein the plurality of nozzles direct the chemical treatment generally parallel with the saw blades, and wherein the chemical treatment is blocked in part by the saw blades so that some amount of the chemical treatment is sprayed onto the saw blades, wherein the saw blades span above and below the top and bottom of the saw arm, wherein the nozzles are formed on the top and bottom of the saw arm, and wherein the nozzles are flush with the top and bottom of the saw arm.

2. The apparatus of claim 1, further comprising at least one further nozzle formed perpendicularly to the plurality of nozzles.

3. The apparatus of claim 1, wherein the apparatus is attachable to a boom along a first axis, and wherein the saw arm is rotatable around a second axis perpendicular to the first axis.

4. The apparatus of claim 1, wherein the apparatus is attachable to a boom along a first axis, and wherein the apparatus is rotatable around the first axis.

5. The apparatus of claim 1, wherein the apparatus is attachable to a boom along a first axis, and wherein the apparatus is bendable at an angle with respect to the first axis.

6. The apparatus of claim 1, wherein the apparatus is attachable to a boom along a first axis, and wherein
the saw arm is rotatable around a second axis perpendicular to the first axis,
the apparatus is rotatable around the first axis, and
the apparatus is bendable at an angle with respect to the first axis.

7. The apparatus of claim 1, wherein the apparatus further comprises at least one jaw for grabbing the vegetation to be trimmed.

8. The apparatus of claim 7, wherein the jaw is serrated.

9. The apparatus of claim 1, wherein the nozzles spray the chemical treatment at a location where the saw blades trim the vegetation.

10. The apparatus of claim 1, wherein the chemical treatment comprises a herbicide.

11. An apparatus for trimming and chemically treating vegetation, comprising:
an elongated saw arm having a top, bottom, sides, and ends;
a plurality of parallel saw blades, wherein the saw blades are coupled along a side of the elongated saw arm for trimming vegetation, wherein the saw blades each have an axis of rotation perpendicular to the side of the elongated saw arm; and
a sprayer assembly having a plurality of nozzles on the top and bottom of the elongated saw arm for spraying a chemical treatment on the vegetation, wherein the plurality of nozzles direct the chemical treatment generally parallel with the saw blades, and wherein the chemical treatment is blocked in part by the saw blades so that some amount of the chemical treatment is sprayed onto the saw blades,
wherein the saw blades span above and below the top and bottom of the elongated saw arm,
wherein the nozzles are flush with the top and bottom of the elongated saw arm.

12. The apparatus of claim 11, wherein the sprayer assembly further comprises at least one second nozzle formed on a side of the elongated saw arm.

13. The apparatus of claim 12, wherein the sprayer assembly further comprises two second nozzles formed on a side and proximate the ends of the elongated saw arm.

14. The apparatus of claim 13, wherein the saw blades appear on the same side of the elongated saw arm as do the second nozzles.

15. The apparatus of claim 14, wherein the second nozzles pop up beyond the side of the elongated saw arm when activated.

16. The apparatus of claim 11, wherein the saw blades are located on one side of the elongated saw arm.

17. The apparatus of claim 11, further comprising at least one channel formed within the elongated saw arm to pass the chemical treatment to the sprayer assembly.

18. The apparatus of claim 17, wherein the elongated saw arm comprises two pieces with the channel formed or milled therein.

19. The apparatus of claim 17, wherein the elongated saw arm comprises a single piece of material and wherein the channel is milled thereinto.

20. The apparatus of claim 11, wherein the sprayer assembly sprays the chemical treatment at a location where the at least one saw blade trims the vegetation.

21. A vehicle for trimming and chemically treating vegetation, comprising:
a boom attached to the vehicle;
a tank attached to the vehicle for holding a chemical treatment and
an apparatus attached to an end of the boom, the apparatus comprising:
a saw arm having a top, a bottom, sides and ends, a plurality of parallel saw blades affixed along a side of the saw arm for trimming the vegetation, wherein the saw blades each have an axis of rotation perpendicular to the side of the saw arm; and
a plurality of nozzles affixed in or to the saw arm, wherein the nozzles are coupled to the tank by a hose for spraying the chemical treatment on the vegetation, and wherein the plurality of nozzles direct the chemical treatment generally parallel with the saw blades, and wherein the chemical treatment is blocked in part by the saw blades so that some amount of the chemical treatment is sprayed onto the saw blades,
wherein the saw blades span above and below the top and bottom of the saw arm,
wherein the nozzles are formed on the top and bottom of the saw arm, and
wherein the nozzles are flush with the top and bottom of the saw arm.

22. The vehicle of claim 21, wherein the apparatus is attached to the boom along a first axis, and wherein the saw arm is rotatable around a second axis perpendicular to the first axis.

23. The vehicle of claim 21, wherein the apparatus is attached to the boom along a first axis, and wherein the apparatus is rotatable around the first axis.

24. The vehicle of claim 21, wherein the apparatus is attached to the boom along a first axis, and wherein the apparatus is bendable at an angle with respect to the first axis.

25. The vehicle of claim 21, wherein the apparatus is attached to the boom along a first axis, and wherein
the saw arm is rotatable around a second axis perpendicular to the first axis,
the apparatus is rotatable around the first axis, and
the apparatus is bendable at an angle with respect to the first axis.

26. The vehicle of claim 21, wherein the apparatus further comprises at least one jaw for grabbing the vegetation to be trimmed.

27. The vehicle of claim 26, wherein the jaw is serrated.

28. The vehicle of claim 21, wherein the nozzles spray the chemical treatment at a location where the saw blades trim the vegetation.

29. The vehicle of claim 21, wherein the chemical treatment comprises a herbicide.

30. The vehicle of claim 21, further comprising at least one additional nozzle perpendicular to the plurality of nozzles.

31. A method for trimming and chemically treating vegetation using an apparatus, comprising:
- trimming the vegetation with a plurality of parallel saw blades, wherein the saw blades reside in series along a saw arm having a top, a bottom, sides, and ends, wherein the saw blades each having an axis of rotation perpendicular to a side of the saw arm; and
- simultaneously spraying with a plurality of nozzles a chemical treatment on the vegetation being trimmed in the proximity of the saw blades, wherein the plurality of nozzles direct the chemical treatment generally parallel with the saw blades, and wherein the chemical treatment is blocked in part by the saw blades so, that some amount of the chemical treatment is sprayed onto the saw blades,
- wherein the saw blades span above and below the top and bottom of the saw arm,
- wherein the nozzles are formed on the top and bottom of the saw arm, and
- wherein the nozzles are flush with the top and bottom of the saw arm.

32. The method of claim 31, wherein the saw blades and nozzles are formed on the apparatus.

33. The method of claim 32, wherein the apparatus is attached to a boom along a first axis, and wherein the apparatus is rotatable around the first axis.

34. The method of claim 32, wherein the apparatus is attached to a boom along a first axis, and wherein the apparatus is bendable at an angle with respect to the first axis.

35. The method of claim 32, wherein the apparatus is affixed to a boom on a vehicle, and wherein the method further comprises driving to the location of the vegetation to be trimmed.

36. The method of claim 35, wherein the vehicle comprises a tank affixed to the apparatus by a hose for storing the chemical treatment.

37. The method of claim 31, wherein the nozzles are affixed in or to the saw arm.

38. The method of claim 37, wherein the apparatus is attached to a boom along a first axis, and wherein the saw arm is rotatable around a second axis perpendicular to the first axis.

39. The method of claim 37, wherein the apparatus is attached to a boom along a first axis, and wherein
- the saw arm is rotatable around a second axis perpendicular to the first axis,
- the apparatus is rotatable around the first axis, and
- the apparatus is bendable at an angle with respect to the first axis.

40. The method of claim 31, further comprising clamping the vegetation to be trimmed with at least one jaw.

41. The method of claim 40, wherein the jaw is serrated.

42. The method of claim 31, wherein spraying the chemical treatment comprises spraying at a location where the at least one saw blade trims the vegetation.

43. The method of claim 31, wherein the chemical treatment comprises a herbicide.

44. The method of claim 31, wherein the herbicide comprises Krenite.

* * * * *